UNITED STATES PATENT OFFICE.

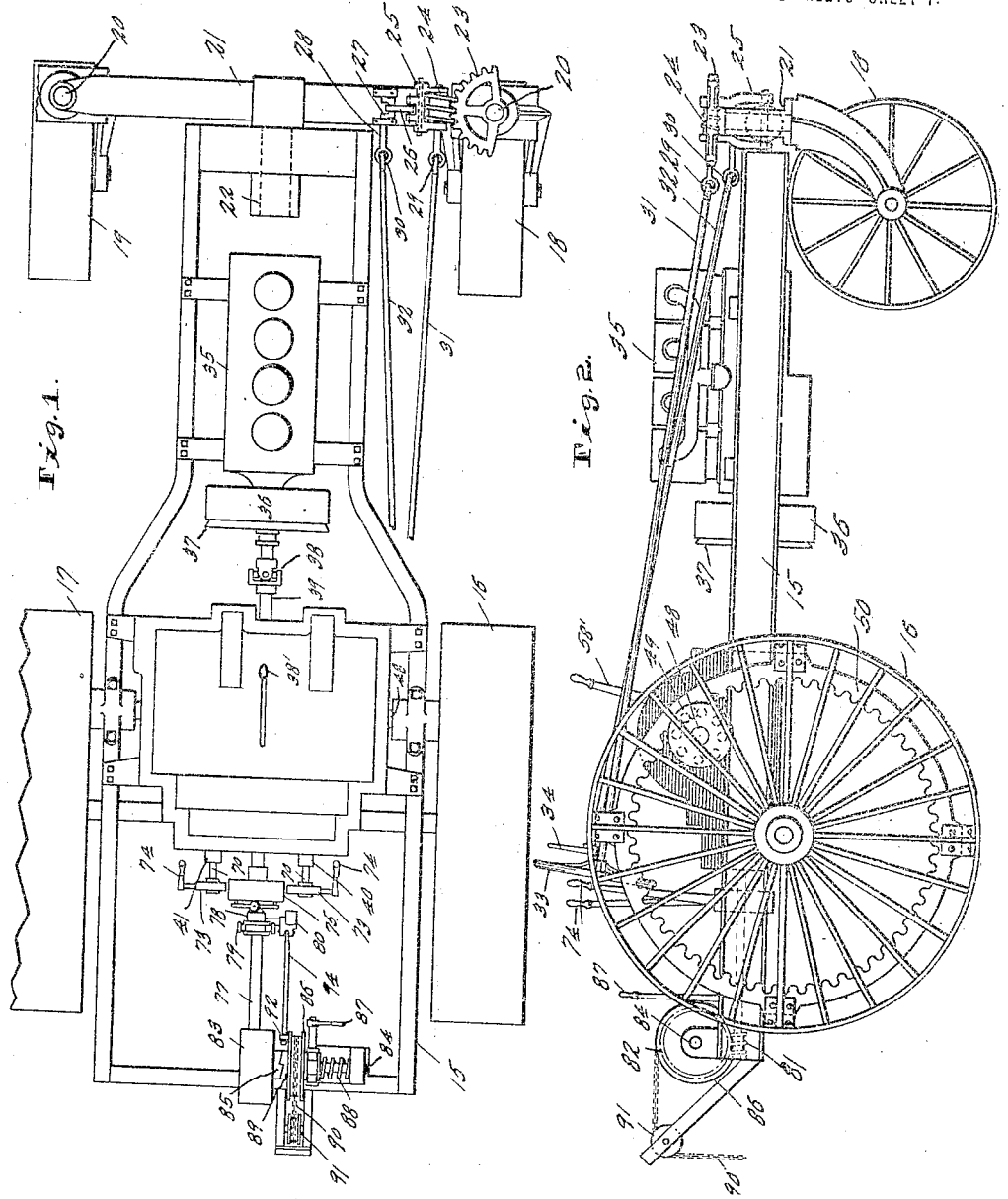

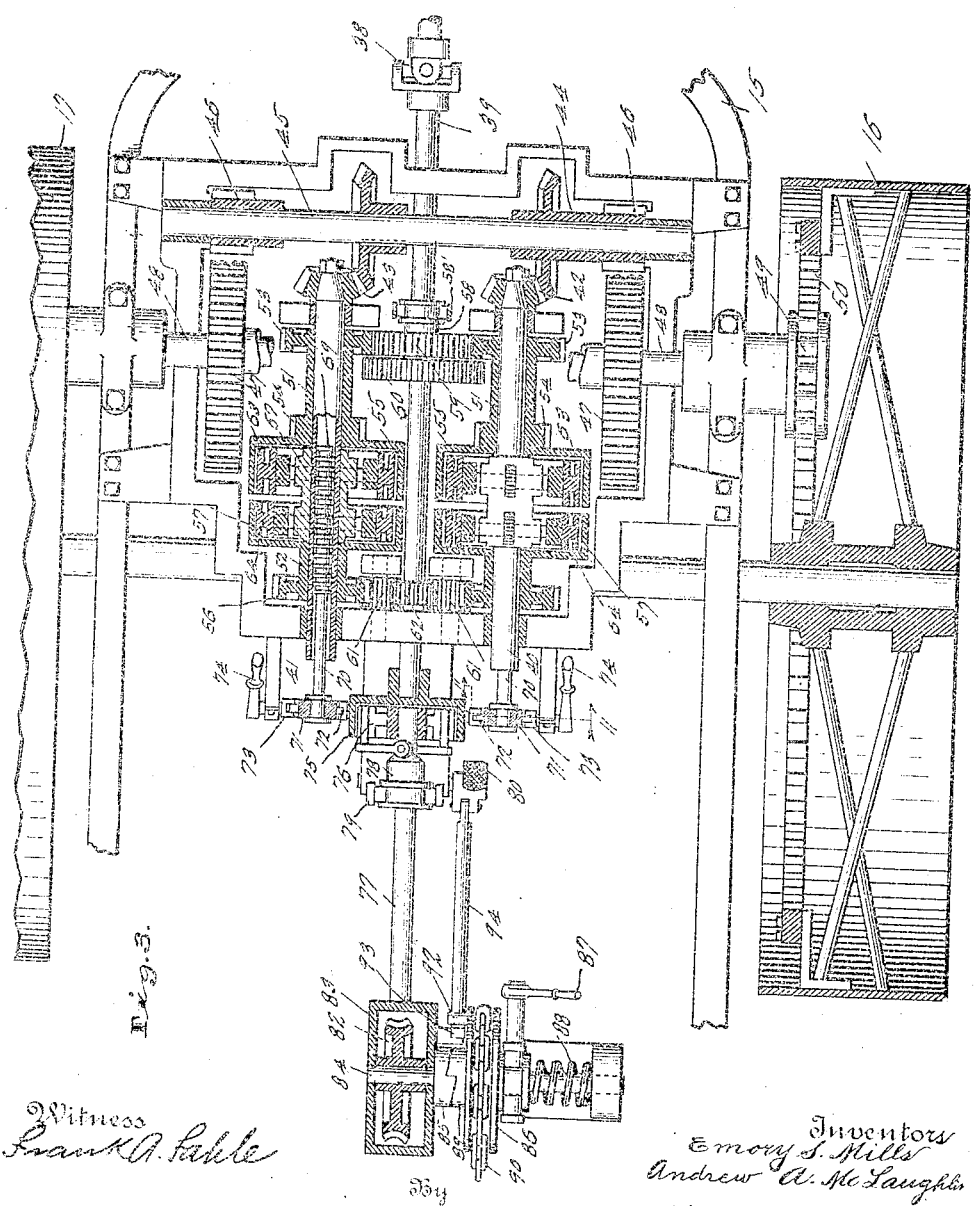

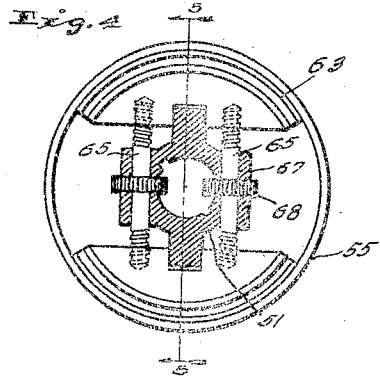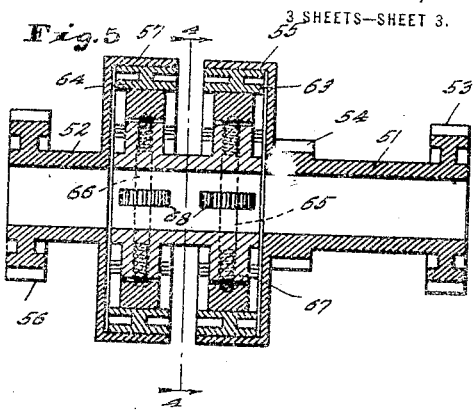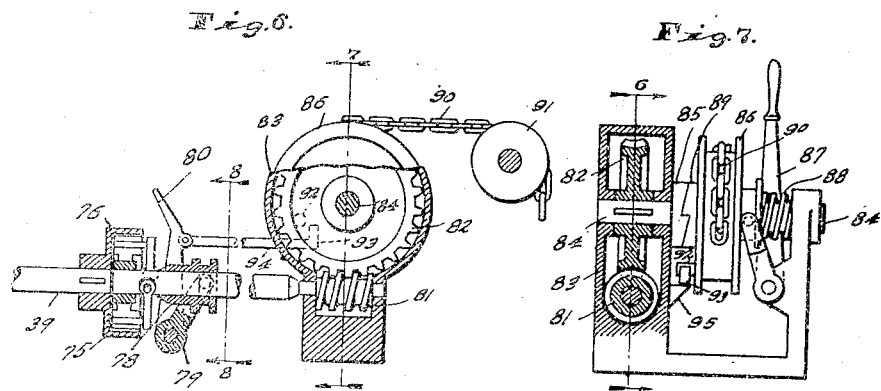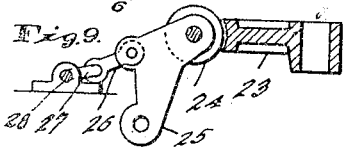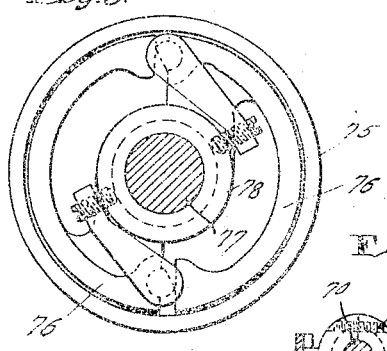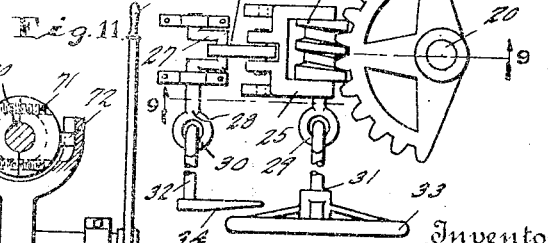

EMORY S. MILLS AND ANDREW A. McLAUGHLIN, OF MUNCIE, INDIANA, ASSIGNORS TO MUNCIE WHEEL COMPANY, OF MUNCIE, INDIANA, A CORPORATION OF INDIANA.

TRACTOR.

1,285,307. Specification of Letters Patent. Patented Nov. 19, 1918.

Application filed July 30, 1917. Serial No. 183,423.

*To all whom it may concern:*

Be it known that we, EMORY S. MILLS and ANDREW A. McLAUGHLIN, citizens of the United States, residing at Muncie, in the county of Delaware and State of Indiana, have invented a new and useful Tractor, of which the following is a specification.

The object of our invention is to produce a simple, compact, and efficient driving train for farm tractors, whereby the traction wheels may be independently controlled to produce rotation in either direction and at the same or different speeds, and thereby control the movements of the tractor by such control of the traction wheels, and to provide additional wheels which ordinarily serve as caster wheels in the direction-controlling action by the tractor wheels but may be thrown into action to control or assist in the control of the direction of movement; and to obtain the control of the traction wheels from a single main shaft which extends longitudinally of the machine and may also be connected to a hoisting gear for elevating tools from active position, which hoisting gear may be readily controlled and automatically disconnected when sufficient hoisting has been obtained.

The accompanying drawings illustrate our invention. Figure 1 is a plan of a tractor embodying our invention; Fig. 2 is a side elevation of such tractor; Fig. 3 is an enlarged plan, in partial horizontal section, of the driving train for the traction wheels and hoisting gear; Fig. 4 is a transverse section on the line 4—4 of Fig. 5 through a branch of the driving train leading to one of the traction wheels; Fig. 5 is a section on the line 5—5 of Fig. 4; Fig. 6 is a section on the line 6—6 of Fig. 7 showing the hoisting drum and associated parts; Fig. 7 is a section on the line 7—7 of Fig. 6; Fig. 8 is an enlarged section on the line 8—8 of Fig. 6, omitting the shifting lever; Fig. 9 is a section on the line 9—9 of Fig. 10, showing the arrangement for throwing in and out the control mechanism for the front caster wheel; Fig. 10 is a plan of such control mechanism; and Fig. 11 is an enlarged section on the line 11—11 of Fig. 3.

The tractor frame 15 is supported near the rear on two traction wheels 16 and 17, and at the front on two caster wheels 18 and 19 which are mounted to swing on vertical pivot pins 20 at the ends of a front axle 21 connected to the frame 15 on a horizontal forwardly and rearwardly extending pivot pin 22. The horizontal axes of the caster wheels 18 and 19 are to the rear of the vertical plane of the pivot pins 20, so that such caster wheels normally swing as casters to take the proper course as the direction of travel of the machine is controlled by the traction wheels 16 and 17 in a manner hereinafter described. However, when desired, either or both caster wheels 18 and 19 may be positively swung around their pivot pins 20, to control or assist in the control of the steering. This is shown for the caster wheels 18 only, the pivot pin of which has mounted thereon a worm wheel sector 23 which may coöperate with a worm 24 carried by a sliding frame 25 slidable lengthwise of the axle 21 to throw the worm 24 into and out of mesh with the worm wheel sector 23. This sliding may be accomplished by a link 26 which connects the sliding frame 25 to a crank 27 on a shifting shaft 28. The worm 24 and the shifting shaft 28 may be controlled in any convenient manner, but are preferably connected, through universal joints 29 and 30, to shafts 31 and 32 which lead to the rear of the tractor and are there provided with a steering wheel 33 and a shifting lever 34 respectively. When the shifting lever 34 is thrown to the left, the worm 24 is out of mesh with the worm wheel sector 23, so that the caster wheel 18 may swing as a caster; but when the shifting lever 34 is thrown to the right the worm 24 is thrown into mesh with the worm wheel sector 23 so that by manipulation of the steering wheel 33 the caster wheel 18 may be positively controlled, to control or assist in the control of the steering.

The tractor frame 15 carries the usual engine 35, near its forward end, and the shaft of this engine carries the usual fly wheel 36 and is connected, preferably through a clutch 37 and a universal joint 38, to a rearwardly extending shaft 39 which extends longitudinally and substantially centrally of the tractor frame as the main shaft of the driving train. Paralleling the shaft 39 are two hollow counter shafts 40 and 41 which are respectively connected at their forward ends through bevel gearing 42 and 43 to a sleeve 44 and a shaft 45 on which such sleeve is loosely mounted, and this shaft and sleeve are each provided with a pinion 46 which meshes with a gear 47 on one of two transverse jack shafts 48, each of which jack shafts at its end is provided with a driving pinion 49 meshing with an internal gear 50 on one of the traction wheels 16 and 17.

Two sleeves 51 and 52 are journaled on each of the hollow shafts 40 and 41. Each sleeve 51 is provided with two gears 53 and 54 of different size, and with an outer friction drum 55; and each sleeve 52 is provided with a gear 56 and an outer friction drum 57. A sleeve 58 splined on the shaft 39 is provided with two gears 59 and 60 of proper size to mesh with the gears 53 and the gears 54 respectively when such sleeve is moved to the two limits of its movement by the shifting lever 58', thus providing two gear ratios between the shafts 39 and each of the sleeves 51. Each gear 56 meshes with an idler gear 61, which two idler gears mesh with a common gear 62 on the shaft 39. Thus the sleeves 52 are driven in the reverse direction from the sleeves 51. The two drums 55 and 57 on each hollow shaft 40 or 41 have their two open ends toward each other, and within and coöperating with such two friction drums are two pairs of friction shoes 63 and 64 respectively, which are mounted on pairs of screws 65 and 66 carried by a supporting member 67 keyed on such hollow shaft. Each screw 65 and 66 is oppositely threaded at its ends, and is provided at its middle with a pinion 68 which projects into the hollow shaft 40 or 41 and there meshes with teeth 69 formed on a rod 70 longitudinally slidable within such hollow shaft. The threads on the ends of the screws 65 are in the opposite sense from those in the corresponding ends of the screws 66, so that as a rod 70 is moved longitudinally of its hollow shaft the friction shoes 63 and 64 associated with such hollow shaft are moved in opposite senses, the shoes 63 being moved outward when the shoes 64 are moved inward and vice versa. By this arrangement, moving the rod 70 axially in one direction causes the shoes 63 to engage the friction drum 55 to interlock the sleeve 51 to the hollow shaft 40 or 41, for forward driving through either the gears 59 and 53 or the gears 60 and 54; and moving such rod axially in the other direction causes the shoes 64 to engage the friction drum 57 to interlock the sleeve 52 to the hollow shaft 40 or 41, for rearward driving through the gears 62, 61, and 56. By manipulating the two rods 70 in the proper manner, it is thus possible to drive the two traction wheels 16 and 17 either in the same or opposite directions, and at the same or different speeds by permitting slipping of the shoes within the friction drum, or one traction wheel can be driven while the other remains stationary, for each rod 70 preferably has an intermediate position in which its associated friction shoes are out of engagement with both the associated friction drums. By this means the ordinary control of the steering of the tractor is obtained, the front caster wheels 18 and 19 acting as caster wheels; but this steering may be supplemented or superseded by the positive control of the caster wheel 18 by the steering wheel 33 when that is desirable or necessary.

In order to manipulate the rods 70, each of them is provided at its rear end with a collar 71 from which project cross pins 72 coöperating with a shifting yoke 73 operable by a suitable shifting lever 74.

At its rear end the shaft 39 is provided with a friction drum 75, with which coöperate expansible clutch members 76 fixed on a shaft 77 in alinement with the shaft 39, the clutch members 76 being controlled by a shifting cone 78 which when shifted in one direction forces the clutch members 76 outward into engagement with the friction drum 75. The cone is shiftable by a suitable yoke 79 operable by a foot lever 80.

The shaft 77 extends to the rear of the tractor frame 15, and is associated with power-transmitting mechanism for driving some additional device. As shown, it is provided with a worm 81 which meshes with a worm wheel 82, the worm and worm wheel being mounted in an oil-tight casing 83. The worm wheel 82 is carried by a shaft 84, one end of which projects through the casing 83 and is provided with a clutch member 85 at an intermediate point in its length. Journaled on the projecting portion of the shaft 84 is a winding drum 86, which is axially shiftable on the shaft 84 by means of a hand lever 87, being normally urged toward the clutch member 85 by a spring 88. The drum 86 is provided with a clutch member 89 which meshes with the clutch member 85, and carries a chain 90 which passes rearwardly over an idler and from thence downward to any tool, such, for instance, as a plow (not shown). The drum 86 also carries a pin 92 which when the drum 86 is moved to a predetermined position in a winding direction engages a finger 93 carried by a rod 94 attached to the foot lever 80, the rear end of such rod 94, or the end provided with the finger 93, resting on a shelf 95 so that it will be maintained in the path of movement of the pin 92.

The operation is as follows:

The shaft 39 is set into or out of operation by the clutch 37. By manipulating the two levers 74 and the lever 58', thereby shifting the two rods 70 and the sleeve 58, the sleeves 51 and 52 on each of the hollow shafts 40 and 41 are controlled to produce movements of the traction wheels 16 and 17 in either the same or opposite directions, and with varying speeds when in the forward direction. This gives the normal control of the tractor movement, which however may be supplemented or superseded by the control of the front caster wheel 18 by the steering wheel 33 when the shifting lever 34 is moved to the position to cause meshing of the worm 24 and the worm wheel sector 23. By operating the foot lever 80 the expansible clutch members 76 may be thrown into engagement with the drum 75 to operate the shaft 77, which operation if the clutch members 85 and 89 are in engagement causes the drum 86 to be turned in the proper direction to lift the plow or other implement attached to the chain 90. Such lifting continues but for a limited distance, for when the drum 86 has been moved to a predetermined point the pin 92 strikes the finger 93 and moves the foot lever 80 to a position to release the expansible clutch members 76 and thus stops the shaft 77.

We claim as our invention:

1. In a tractor, the combination of a tractor frame, supporting wheels for said frame including a traction wheel on each side, a main engine-driven shaft extending longitudinally of said frame, two hollow counter shafts paralleling said main shaft, a connection from each of said counter shafts to one of said traction wheels, two sleeves loosely mounted on each of said counter shafts, gearing connecting each of said sleeves to said main shaft, said gearing including gears on said main shaft which are common to the gearing leading to the sleeves on both counter shafts, and means slidable within said hollow counter shafts for controlling the connection to such counter shaft of the sleeves thereon.

2. In a tractor, the combination of a tractor frame, supporting wheels for said frame including a traction wheel on each side, a main engine-driven shaft extending longitudinally of said frame, two hollow counter shafts paralleling said main shaft, a connection from each of said counter shafts to one of said traction wheels, two sleeves loosely mounted on each of said counter shafts, gearing connecting each of said sleeves to said main shaft, and means slidable within said hollow counter shafts for controlling the connection to such counter shaft of the sleeves thereon.

3. In a tractor, the combination of a tractor frame, supporting wheels for said frame including a traction wheel on each side, a main engine-driven shaft extending longitudinally of said frame, two counter shafts paralleling said main shaft, a connection from each of said counter shafts to one of said traction wheels, two sleeves loosely mounted on each of said counter shafts, gearing connecting each of said sleeves to said main shaft, said gearing including gears on said main shaft which are common to the gearing leading to the sleeves on both counter shafts, and means associated with each counter shaft for connecting to such counter shaft either sleeve mounted thereon.

4. In a tractor, the combination of a tractor frame, supporting wheels for said frame including a traction wheel on each side, a main engine-driven shaft extending longitudinally of said frame, two counter shafts paralleling said main shaft, a connection from each of said counter shafts to one of said traction wheels, two sleeves loosely mounted on each of said counter shafts, gearing connecting each of said sleeves to said main shaft, and means associated with each countershaft for connecting to such countershaft either sleeve mounted thereon.

5. In a tractor, the combination of a tractor frame, supporting wheels for said frame including a traction wheel on each side, a main engine-driven shaft extending longitudinally of said frame, two hollow counter shafts paralleling said main shaft, a connection from each of said counter shafts to one of said traction wheels, two sleeves loosely mounted on each of said counter shafts, gearing connecting each of said sleeves to said main shaft, said gearing including a sleeve slidable on said main shaft and carrying gears of different size which by the movement of such sleeve may be caused to mesh with gears of different size on a sleeve on each counter shaft, and means slidable within said hollow counter shafts for controlling the connection to such counter shaft of the sleeves thereon.

6. In a tractor, the combination of a tractor frame, supporting wheels for said frame including a traction wheel on each side, a main engine-driven shaft extending longitudinally of said frame, two counter shafts paralleling said main shaft, a connection from each of said counter shafts to one of said traction wheels, two sleeves loosely mounted on each of said counter shafts, gearing connecting each of said sleeves to said main shaft, said gearing including a sleeve slidable on said main shaft and carrying gears of different size which by the movement of such sleeve may be caused to mesh with gears of different size on a sleeve on each counter shaft, and means associated with each counter shaft for connecting to such counter shaft either sleeve mounted thereon.

7. In a tractor, the combination of a tractor frame, supporting wheels for said frame including a traction wheel on each side, a main engine-driven shaft extending longitudinally of said frame, two counter shafts paralleling said main shaft, a connection from each of said counter shafts to one of said traction wheels, a set of gearing between said main shaft and said countershafts for driving the latter in one direction and a separate set of gearing between said main shaft and said countershafts for driving the latter in the opposite direction, the two countershafts being connectible independently of each other to either of said two sets of gearing, a shaft in alinement with said main shaft.

8. A tractor, comprising a frame, two traction wheels mounted on said frame, means for independently controlling said traction wheels, an axle mounted on said frame to swing about a central horizontal pivotal axis, two caster wheels mounted at opposite ends of said axle, steering mechanism for one of said caster wheels, and means for throwing said steering mechanism into and out of operative connection with the caster wheel which it may control.

9. A tractor, comprising a frame, two traction wheels mounted thereon, an axle mounted on said frame to swing about a central horizontal pivotal axis, two caster wheels mounted at opposite ends of said axle, means for controlling said traction wheels to drive them in the same or opposite directions at will, steering mechanism for one of said caster wheels, and means for throwing said steering mechanism into and out of operative connection with the caster wheel which it may control.

In witness whereof, we have hereunto set our hands at Muncie, Indiana, this 26th day of July, A. D. one thousand nine hundred and seventeen.

EMORY S. MILLS.
ANDREW A. McLAUGHLIN.